Patented Feb. 13, 1940

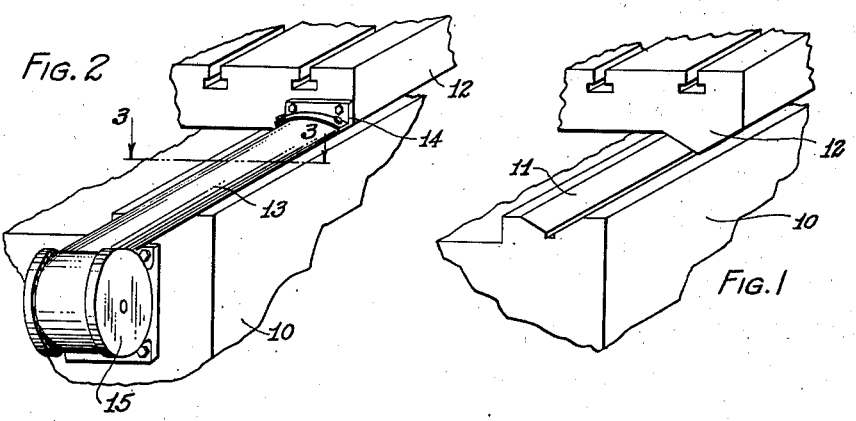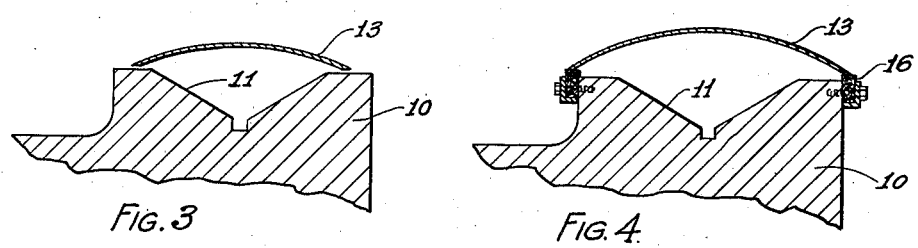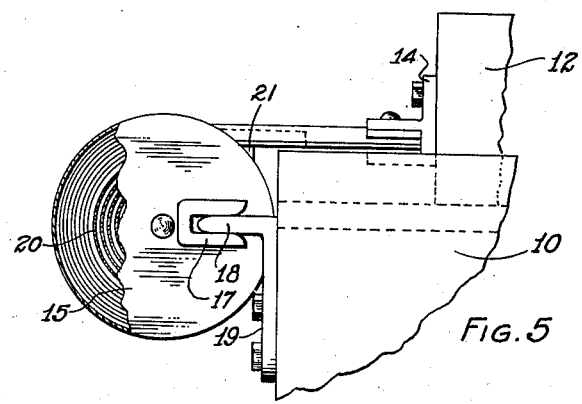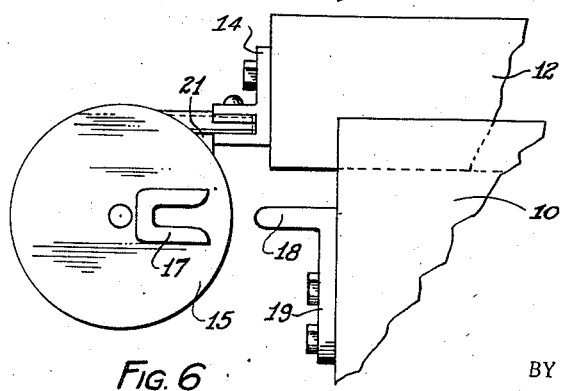

2,190,213

UNITED STATES PATENT OFFICE 2,190,213

WAY GUARD FOR MACHINE TOOLS

Henry F. Meyer, University Heights Station, Ohio

Application December 15, 1937, Serial No. 179,915

6 Claims. (Cl. 90—58)

This invention relates broadly to shields for protecting the guide-ways of machines constructed with exposed reciprocating parts and more specifically to an improved way guard which contemplates generally a flexible metal tape capable of reentrant adjustment, in coiled form, within a housing mounted upon the machine bed or the reciprocating member coordinated therewith.

One of the objects of the invention is to provide a way guard for machine tools which is capable of self support in spaced relation with the machine bed when the guard is disposed in its extended position.

Another object of the invention is to provide a shield which is adapted for automatic coiled adjustment within its casing upon translation of the reciprocating member of the machine.

Another object of the invention is to provide a shield which is adapted to coil without buckling under the longitudinal thrust imposed upon the end portion thereof during the operation of the machine.

Another object of the invention is to provide a housing to received the coiled portion of the way guard which will accommodate application of the device upon machines where the movable part overrides the fixed member of the assembly.

Other objects and advantages more or less ancillary of the foregoing and the manner in which all the various objects are realized will appear in the following description which, considered in connection with the accompanying drawing, sets forth the preferred embodiment of the invention.

Referring to the drawing wherein the present invention is shown as coordinated with the carriage and bed of a milling machine or similar metal working tool.

Fig. 1 is a fragmentary portion of a milling machine bed and carriage illustrating a structure which is typical to machines;

Fig. 2 is a perspective view of the machine bed and carriage illustrated in Fig. 2, but showing the improved way guard thereon;

Fig. 3 is a vertical section through the way guard or shield illustrated in Fig. 1, the section being taken on a plane indicated by the line 3—3 in Fig. 1;

Fig. 4 is a vertical sectional view through the ways of a machine illustrating a modified form of the guard shown in Fig. 3;

Fig. 5 is a side elevational view of a fragmentary portion of a machine tool of the type which embodies a sliding carriage wherein the carriage overrides the bed and showing mounting of the way guard housing upon machines of this character; and Fig. 6 is a side elevational view of the machine illustrated in Fig. 5, showing the carriage and guard housing in their actuated position.

As illustrated in Fig. 1, the machine chosen for purposes of showing one type of mechanism which embodies a stationary and reciprocating number, comprises a base or bed 10 having guide-ways 11, machines to receive the slides formed in the carriage 12. In machines of this character the ways 11 are machined and scraped in with the utmost care and precision since the accuracy of the machine is dependent upon the aligned relation of the cutting tool with the carriage and the alignment of the carriage with the ways. In order to prevent chips and other foreign matter from falling upon the ways 11, the present invention contemplates a flexible steel tape 13 of arcuate transverse section and of suitable width to span the channel defined by guideway ledges. As illustrated in Fig. 2, one end of the shield is secured to the carriage 12 by a bracket 14 bolted to the carriage and formed for the affixation of the end portion of the tape or shield 13. The opposed end of the tape is coiled within a cylindrical housing 15 bolted upon the end face of the machine bed 10. As will be recognized by observation of a curved, flexible steel tape, an appreciable length of such a tape is capable of lineal self support. Thus, as will be seen in Fig. 3, the steel ribbon or shield 13 may be arranged to span the machine ways and extend thereover in spaced relation therewith without the necessity of the provision of an auxiliary support or wear plate. It is also well known that a curved, flexible tape of this character may be readily coiled within a chamber upon application of pressure upon the free end thereof, thus the housing or retainer 15 shown in Fig. 2 need not of necessity be formed with a spring retraction mechanism to effect the coiled adjustment of the tape.

As illustrated in Fig. 4, the tape 13 is formed to span the side walls of the ribs constituting the guide-way 11. In this form the marginal edges of the tape are disposed to be borne upon a felt or a similar yieldable packing material 16 suitably mounted upon the side walls of the way ledges. If desired, the felt 16 may be impregnated with a relatively heavy lubricant which will tend to preclude the admission of dust and finely divided foreign matter between the engaging surfaces of the felt strip and the shield 11.

In certain mechanisms, particularly planers and milling machines of modern design the carriage 12 is constructed to override or travel beyond the end of the base 10. In order to accommodate the guard or shield embodying the present invention to machines of this character, the housing 15 is formed with a pair of slotted bosses 17 in the opposed side walls thereof which are engageable with the extended end portion or tongue 18 of a bifurcated bracket 19 secured to the bed of the machine. In this case the housing 15 is provided with a spiral spring 20 affixed to the inner end of the tape and suitably tensioned to effect the retraction thereof as the carriage 12 travels in the direction of the housing, without causing displacement or removal of the housing from its supporting bracket 19. In this construction when the carriage reaches the end of the machine bed 10 the end portion of the bracket 14 will abut a boss 21 formed upon the peripheral face of the housing 15, disengage the housing from the tongue 18 and carry the housing, supported by the tape until upon the return movement of the carriage the ears 17 re-engage the tongue 18 and again sustain the housing in its supported relation upon the machine bed.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a machine tool embodying a base having ways thereon and a carriage slidably mounted on said ways, a shield for said ways, comprising a metal shield of arcuate transverse section, a cylindrical housing for said shield, lugs thereon having slots therein, a tongue mounted on said base loosely engageable in said slots, a spring in said housing connected to an end of said tape to effect the retraction thereof in coiled form, a bracket on said carriage disposed for abutting engagement with said housing and having the opposed end of said shield affixed thereto.

2. A way guard for a machine embodying a stationary part having guide-ways thereon and a reciprocating part mounted on said guide-ways comprising a metallic shield of arcuate transverse section formed to span said guide-ways and disposed in spaced relation thereto, a cylindrical housing having an opening therein for the reception of said shield, said housing being mounted upon said stationary part with said opening therein disposed above said ways, one end of said shield being affixed to said reciprocating part, the opposed end thereof being disposed in coiled form within said housing and impinged against the cylindrical walls thereof.

3. In a machine tool embodying a base having ways thereon and a carriage slidably mounted on said ways, a shield for said ways, comprising a metal shield of arcuate transverse section disposed in spaced relation thereto, a cylindrical housing for said shield mounted on said base, said housing having an opening in the circumferential wall thereof disposed superjacent said ways, a resilient material mounted on said base and disposed for engagement with the marginal edges of said shield, one end of said shield being affixed to said carriage, the opposed end thereof being coiled within said housing.

4. A way guard for a machine embodying a stationary part having guide-ways thereon and a reciprocating part mounted on said guide-ways comprising a metallic shield of arcuate transverse section formed to span said guide-ways and disposed in spaced relation thereto, a cylindrical housing supported by said shield, a spring in said housing connected to one end of said shield and adapted to effect the retraction thereof in coiled form within said housing, the opposed end of said shield being affixed to said reciprocating part of the machine, means on said stationary part for the retention of said housing when the reciprocating part is moved away from the housing and means on said housing engageable with the first named means and detachable therefrom when the reciprocating part is moved towards the housing.

5. A way guard for a machine tool embodying a bed having ways and a reciprocating slide mounted thereon comprising, a transversely curved metal tape having one end thereof affixed to said slide superjacent said ways, a cylindrical housing having an opening in the circumferential wall thereof attached to said bed, the opposed end of said tape extending through said opening and engaged with the cylindrical wall of said housing, said housing being disposed so that the opening therein will maintain said tape parallel to the ways throughout the reciprocative movement of the slide, whereby the end of the tape which is engaged with the cylindrical wall of said housing wil be coiled in spiral form under the sole influence of the thrust upon the end affixed to said slide during the reciprocation thereof.

6. In a machine having a reciprocating part and a stationary part formed with guide-ways thereon, a shield for said guide-ways comprising, a tape of arcuate transverse section, a cylindrical housing having an opening therein, said housing being attached to said stationary part with said opening disposed tangential the top thereof, one end of said tape being affixed to said reciprocating part of the machine superjacent said guide-ways, the other end of the tape being extended through said opening in said housing and impinged against the cylindrical wall thereof.

HENRY F. MEYER.